United States Patent [19]

Slotten

[11] Patent Number: 5,662,574

[45] Date of Patent: Sep. 2, 1997

[54] PRESSURE ROLLER

[76] Inventor: John A. Slotten, 3432 W. Highview Dr., Appleton, Wis. 54915

[21] Appl. No.: 406,456

[22] Filed: Mar. 20, 1995

[51] Int. Cl.$^6$ .................................................. B23P 15/00
[52] U.S. Cl. .............................. 492/56; 492/54; 100/176; 100/168
[58] Field of Search ...................... 492/56, 54; 100/176, 100/168; 355/295

[56] References Cited

U.S. PATENT DOCUMENTS

| | | | |
|---|---|---|---|
| 5,195,430 | 3/1993 | Rise | 492/56 |
| 5,253,027 | 10/1993 | Goto | 492/56 |
| 5,257,967 | 11/1993 | Gysin | 492/56 |
| 5,415,612 | 5/1995 | Carlson et al. | 492/56 |
| 5,471,285 | 11/1995 | Nagase et al. | 492/56 |
| 5,474,821 | 12/1995 | Kass | 492/56 |

*Primary Examiner*—Irene Cuda
*Attorney, Agent, or Firm*—Russell L. Johnson

[57] ABSTRACT

A resilient pressure roller of the large type that is of unitary construction with a rigid core, a central body of rubber or synthetic rubber of one durometer and a thin outer shell of another durometer. The body is given a nonlinear longitudinal profile and the shell is given a profile different from that of the body. The differences in profiles of the body and shell, along with their different durometers sum to develop approximately uniform nip profiles along the nip so as to minimize hysteresis heating and degradation in the roller and thereby provide a roller of greatly extended life expectancy.

9 Claims, 4 Drawing Sheets

$$Y = (COS(X*A/(W/2)) - COS(A))/(1 - COS(A)) * C$$

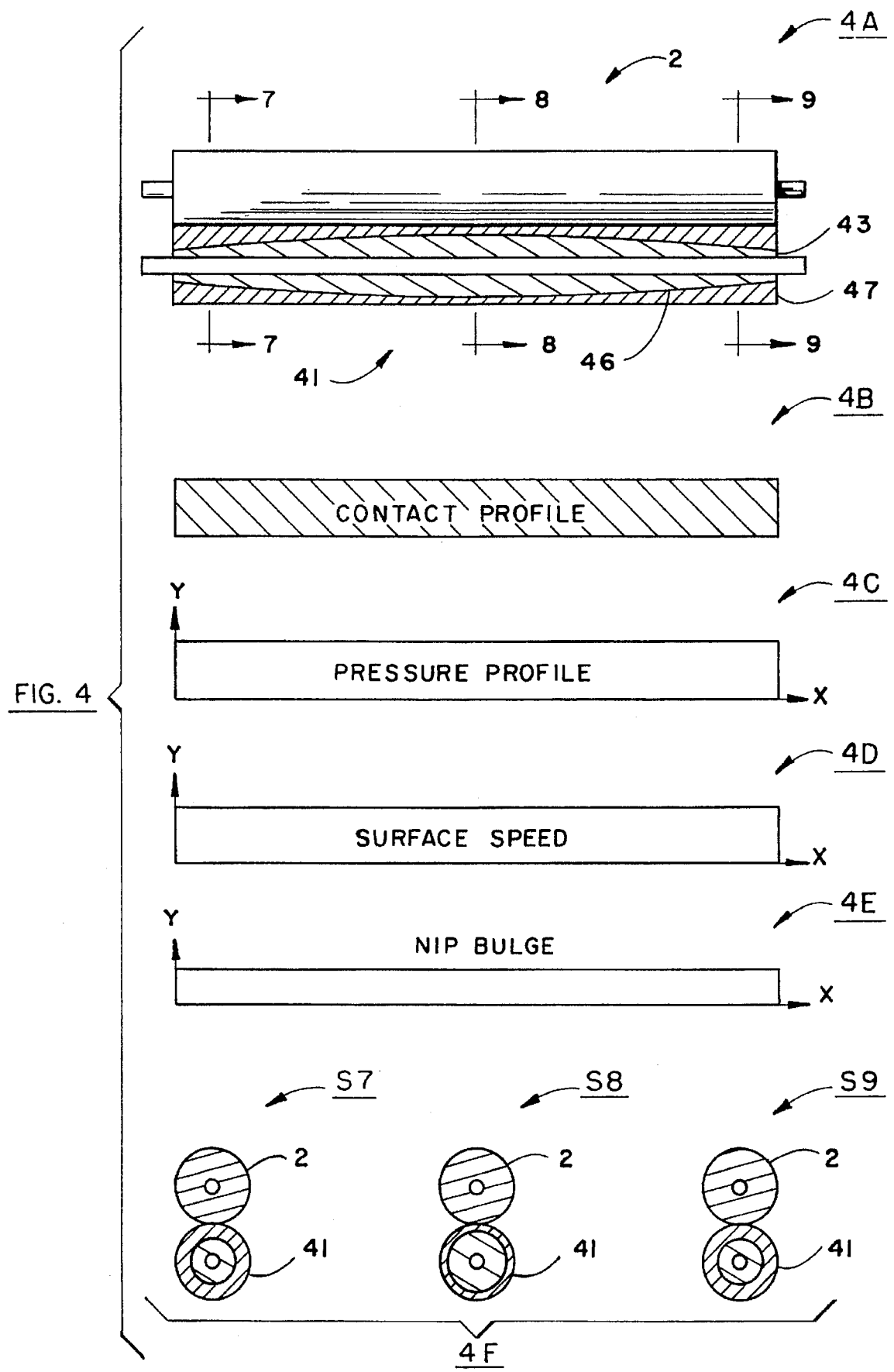

PRESSURE ROLLER

FIELD

This invention relates to pressure rollers.

BACKGROUND

Pressure rollers are resilient rollers that serve to create a pressure in a nip. Nip pressure and control are of critical importance in processes such as embossing and laminating, as well as for web control and draw. Pressure is applied to a pressure roller at the outer ends of the roller. The resilience of the roller material creates a loading on the central shaft or core of the roller that is similar to pressure profiles found in structural beam loading. This causes the central core to bend under a load so that the surface of contact and pressure in the nip is not uniform along the nip. To compensate for this undesirable condition, it is common practice to crown the center portion of the roller. This practice results in uneven wear due to differences in hysteresis in different areas of the roller as well as uneven areas of contact of the roller surface as well as uneven nip bulge and other undesirable operating characteristics.

Wearing of the surface is an important determiner of roller life and usefulness. It is common practice to provide rollers with an outer coating or sleeve that is wear resistant. The coatings or sleeves are typically adhered or shrunk into place.

OBJECTS

It is an object of this invention to provide a pressure roller that has a substantially cylindrical outer profile and which provides nip profiles that are substantially uniform along the length of the nip for properties such as pressure, surface area of contact, nip bulge, surface speed and the like.

It is further an object of this invention to provide a pressure roller as described above wherein the roller is provided with an outer wear resistant surface in the form of an outer shell that has a nonlinear cross sectional profile.

It is further an object of this invention to provide the roller as described that has an unitized structure.

It is further an object of this invention to provide the roller described above wherein the roller life is more than twice the life of prior art rollers used in the same applications.

Other objects will be made apparent by the following specifications, claims, and drawings.

PRIOR ART

The prior art can be divided into two classifications; big roller art and small roller art. Small roller art deals with pressure rollers used in small machines such as office copiers and computer printers, and the like. Large roller art deals with pressure rollers used in manufacturing and production machinery such as embossers, laminators, presses, and the like. Because applications and operating conditions are so different between the two art groups, there is very little shared technology between the two groups.

However, at least superficially, the closest prior art to the instant invention known to the inventor is found in the small roller art, while this invention is in the big roller art.

U.S. Pat. No. 4,594,068 to Bardutzky teaches a pressure roller wherein the roller core is given a nonlinear longitudinal profile, either concave or convex. The core is then provided with a body coating that is given a cylindrical shape and a linear outer profile, such that the thickness of the body coating is of variable thickness along the axis of the roller. A thin outer sleeve of a shrunk-on or adhered film is applied to the body coating to create a cylindrical shaped pressure roller that provides a substantially uniform pressure profile across the nip.

U.S. Pat. No. 5,195,430 to Rise teaches an external pressure applying shell, an elongate core, and an elastomeric material positioned between the shell and the core. The roller of Rise is intended for use in small processing machines which require that the nip pressure be greater at the center of the nip than the pressure at the outer ends of the nip.

U.S. Pat. No. 5,257,967 to Gysin, teaches an inking roller of the large roller type wherein the roller is provided with a stiff core, a roller body of a first flexible material, and and outer casing of a second flexible material different from the first flexible material.

The geometries, and/or materials of construction of rollers, such as those found in the prior art recited above may be the same or similar to those employed in practicing this invention. However, it should be noted that the prior art does not claim or teach the combining of geometries, materials, and methods of construction to provide a resilient pressure roller that when in use in a role for which it was designed will be capable of developing nip profiles for contact area, pressure, surface speed, and nip bulge that are nearly uniform along the length of a pressure nip of which they are a member.

BRIEF DESCRIPTION

The roller of this invention is a pressure roller of the large roller type, comprising; an elongate central core of a material and of a construction that resists deformation and at least a portion to the outer surface of the core is cleansed and treated so as to interlock with and/or bond with a thermally cured rubber material.

A roller body which is formed of a thermally cured rubber which has a first durometer, is formed on the core, and the body is bonded to the core and the body is provided with a nonlinear outer longitudinal profile, and the outer surface of the body is treated and configured so as to bond with a thermally cured rubber.

A thin outer shell which is formed of a thermally cured rubber having a second durometer different from the durometer of the body, is applied to the body and the outer shell is engaged with and bonded to the body and the outer shell is given a longitudinal profile different from the profile given to the body.

The roller has a substantially unitary structure and has a surface wear and hysteresis fatigue life several times that of conventional pressure rollers used in the same applications.

BRIEF DESCRIPTION OF THE DRAWINGS

FIG. 4 is a schematic representation, similar to those of FIGS. 1 and 2 wherein nip profiles of a roller made according to this invention are illustrated.

DETAILED DESCRIPTION

Figure 1:
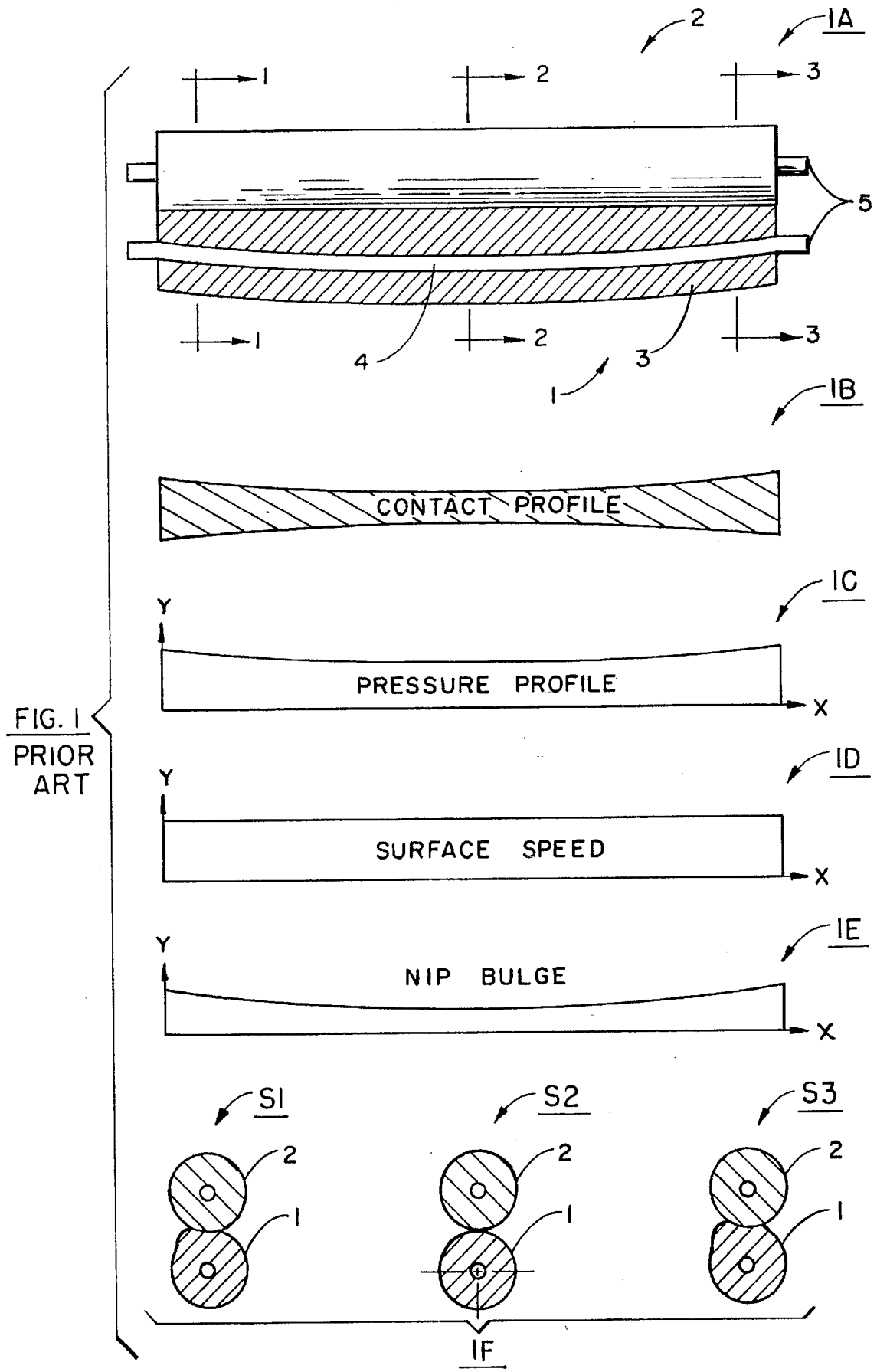
FIG. 1 is a schematic representation of typical nip profiles for cylindrical prior art pressure rollers.

In the drawings like numbers refer to like objects and some proportional relationships have been modified for clarity of illustration.

The term "rubber" as used herein shall be read to mean "natural and synthetic rubbers and plastic materials that have properties commonly associated with rubbers.

Referring now to FIGS. 1 through 5 which are simplified and schematic illustrations of the factors that contribute to an understanding of the novelty and unobviousness of the pressure roller of this invention.

In FIG. 1, the conditions typically present in a nip wherein a pressure roller 1 having a cylindrical outer longitudinal profile is shown. Pressure roller I is run against a rigid roller 2 as shown in part 1A of FIG. 1. Pressure is applied to roller 1 at ends 5 of core 4. Resilience in roller body 3 causes core 4 to undergo a load that is similar to a uniform beam load in a structural beam.

A contact profile similar to the shape illustrated in part 1B of FIG. 1 is a result of the conditions illustrated in part 1A of FIG. 1. That is; there is a greater area of contact at the ends of the rollers than there is in the middle of the rollers.

A pressure profile similar to the curve illustrated in part 1C of FIG. 1 is the result of the conditions illustrated in part 1A of FIG. 1. That is there is a greater pressure applied in the nip at the ends of the rollers than is applied in the middle of the rollers.

A surface speed profile similar to the curve illustrated in part 1D of FIG. 1 is the result of the conditions illustrated in part 1A of FIG. 1. That is the surface speed of all parts of roller 1 are substantially the same as they pass through the nip.

A nip bulge profile similar to the curve illustrated in part 1E of FIG. 1 is the result of the conditions illustrated in part 1A of FIG. 1. Part 1F of FIG. 1 will serve to further illustrate the development of an unequal nip bulge as a result of the conditions illustrated in part 1A of FIG. 1. Core 4 is bowed away from roller 2 so that there is more area of contact between rollers 1 and 2 at the ends as shown at S1 and S3 than there is in the middle of the rollers as shown in S2. This causes roller 1 to develop a bulge prior to entering the nip and the bulge is greater at the ends than it is in the middle which results in a nip bulge profile of the type shown in part 1E of FIG. 1.

When a resilient material is compressed, the energy that is put into compressing the material is greater than the energy given up in the resilient recovery of the material. The difference between the two energies manifests itself as heat. Rubbers are not good conductors of heat and therefore, heat build up in portions of rollers subjected to high stress and strain are a major cause of roller failure due to hysteresis generated thermal fatigue.

Because of the complexities involved with the study of hysteresis heating, technology does not provide a means for dependably graphing or predicting hysteresis profiles. However, the factors that contribute to hysteresis failures are well known and can be generalized. In general, a reduction in factors that generate stresses and strains in materials will reduce the hysteresis heating in the materials. In general, anything that prevents local build up of hysteresis heating will reduce the potentials for hysteresis fatique failures.

The roller of this invention is a low hysteresis roller and as a result of its novel design it has been found that a roller made according to this invention can have a roller life of four times or more greater than a prior art pressure roller used for the same applications.

Figure 2:
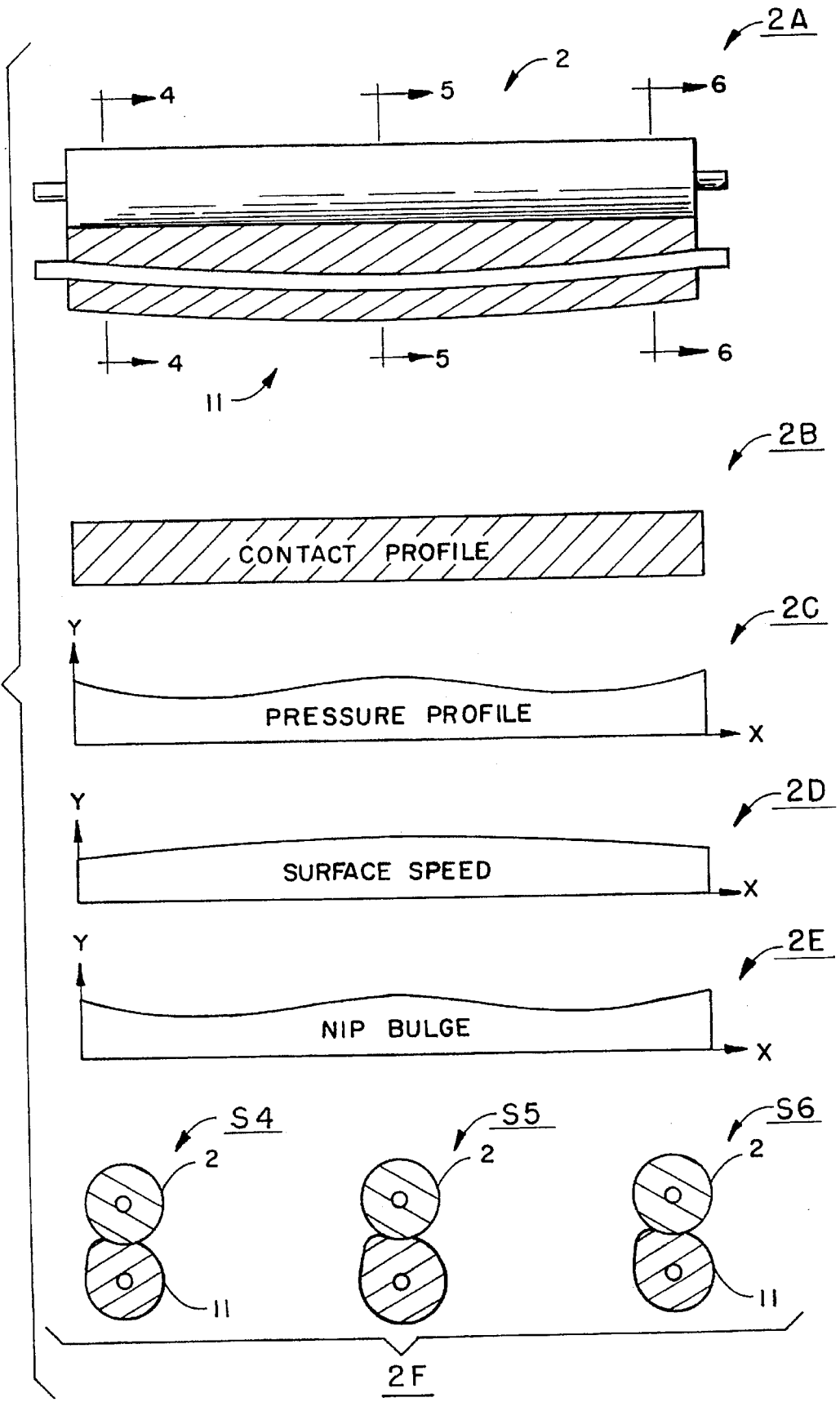
FIG. 2 is a schematic representation of typical nip profiles for crowned prior art pressure rollers.
Figure 3:
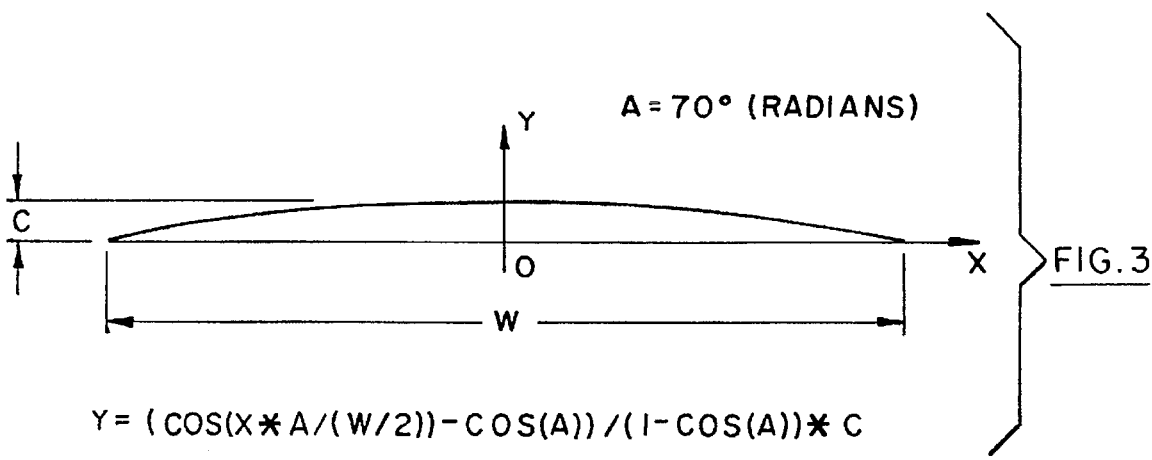
FIG. 3 is a plot of a typical cosine curve and the equation used to generate the curve.

Referring now, specifically, to FIG. 2, wherein a prior art pressure roller having a crowned center is illustrated. Because the applications of pressure rollers frequently require a relatively uniform contact profile along the nip, it is common practice to give resilient pressure rollers a crowned center to achieve a substantially uniform contact profile along the nip.

Part 2A of FIG. 2 illustrates the conditions that would be present when pressure roller 11 is given a crowned profile such that the diameter of roller 11 is greater at its middle than it is at either end.

This configuration will yield a pressure nip that exhibits a pressure profile that is slightly higher at the ends of the nip and in the middle of the nip than it is at points inbetween these locations as shown in part 2C of FIG. 2. As shown in part 2B of FIG. 2, by appropriately crowning a pressure roller, the pressure nip can be given a substantially uniform contact profile. As shown in parts 2E and 2F of FIG. 2, a plot of the nip bulge is greatest at the center of roller 11 and less at its ends, adding to greater hysteresis heating at the center of pressure roller 11 than at its ends. The surface speed of roller 11 as shown in part 2D of FIG. 2 is greater at the center of pressure roller 11 than it is at the ends. This requires that, in order to pass through the nip without slippage with roller 2, the surface of roller 11 must be slowed to the speed of roller 2 as it enters the nip and accelerated after it leaves the nip. This action adds a further element to the expectation of hysteresis heating in the area of the center of pressure roller 11 and a resultant shortened roller life due to hysteresis heating fatigue.

The conditions of FIGS. 1 and 2 are exaggerated to better illustrate the nature of the relationships between materials, geometries, and the various nip profiles being considered. In practice, a typical crown on a large pressure roller might be made according to the equation shown and diagramed in FIG. 3. A typical crown (C) as measured on the diameter, might be in the order of 0.25 inches, measured on the diameter, for a roller having a width (W) of 96 inches and the angle A equals 70 degrees, computed in radians.

Referring now specifically to FIG. 4 wherein the conditions present in a large pressure roller made according to this invention are shown. It will be seen that in parts 4B, 4C, 4D, and 4E and 4F of FIG. 4, that the contact, pressure, surface speed, and nip bulge profiles, respectively are substantially uniform across the nip. In some applications, nip bulge can be reduced to zero. These conditions are achieved by forming roller body 43 of pressure roller 41 of a rubber material having a first durometer and a nonlinear profile 46. A thin outer shell 47 formed of a rubber material having a second durometer different from that of body 43 is applied to the outside of body 43 and, in a preferred embodiment, shell 47 is given a cylindrical profile. At its thinnest point shell 47, in operation behaves more like a thin film than a rigid ring and at its thickest point shell 47 behaves more like a rigid ring than a thin film. The variance in the radial thicknesses of the body 43 and the shell 47 in combination with the differences in their durometers is such that they balance each other out along the nip so as to give roller 41 profiles that are substantially uniform along the nip as illustrated in FIG. 4.

In operations such as embossing, the pressure in the nip is adjusted so that all points along the nip achieve at least the minimum pressure needed to perform the embossing operation. When using a roller made according to this invention the pressure profile is substantially uniform across the nip so that all points of the roller would be under a minimum of compression. This factor permits the use of lower pressures to achieve the embossing operation which results in lower hysteresis fatique and prolongs roller life.

As illustrated in parts 4D and 4E, the surface speed profile and the nip bulge profile of roller 41 are substantially uniform across the nip. This results in a significant reduction in localized stresses and strains and a uniform distribution of hysteresis heating which significantly extends expected roller life.

The relative thinness of shell 47 permits the use of relatively expensive and durable materials to form shell 47. The durable nature of the materials used to form shell 47 further adds to the expected life of roller 41.

In some applications, usually due to the nature of the materials being processed, it is desirable that the roller have an outside profile that is slightly convex or concave. It should be understood that the roller of this invention when required to have a concave or convex outer profile will still exhibit low hysteresis properties when compared to prior art pressure rollers having the same profile when used in the same application.

Pressure rollers are typically designed to have specific characteristics for a small group of specific applications. Therefore it is not practical to attempt to disclose a single specific best mode of practicing the invention. However, a general best mode process for forming a roller according to this invention would typically involve the following steps.

Figure 5:
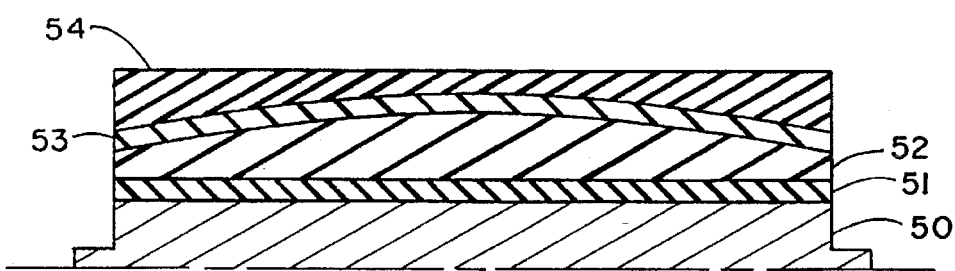
FIG. 5 is a schematic quarter section illustrating the arrangement of elements that contribute to creating a substantially unitary structure for the roller of this invention.

Referring now to FIG. 5, a relatively inflexible core 50, usually of metal is first cleaned and shot peened to enable a vulcanized bond with the rubber material that is to form the body of the roller. A bonding agent 51 may be applied to the prepared core, when indicated, for a specific roller design. A rubber material selected from a group including; neoprene, nitrile, natural rubber, nitrile/PVC, hydrogenated nitrile, silicone, carboxylated nitrile, and flouroelaster is applied to the core. Nitrile and hypalon, having durometers in the order of from 30 to 80 Shore-A, are preferred for forming the body 52 of the roller. The roller is then wrapped with a nylon wrap to assure uniformity of shape and density during curing. The roller is then cured according to the requirements for the material used for the roller body.

After curing, the nylon wrap is removed from the body and the body is turned to form the required nonlinear profile. The profile is typically a crown having a cosine curve of the type described above although parabolic profiles are not uncommon. A bonding agent 53 is then applied to the completed body in designs where bonding agents are indicated. A thin shell 54 of a rubber material selected from a group including; neoprene, nitrile, natural rubber, nitrile/PVC, highly saturated, hydrogenated nitrile, hypalon, silicone, carboxylated nitrile, and flouroelaster having durometers in the order of from 48 to 100 Shore-A, is then applied to the body. Hydrogenated nitrile, carboxylated nitrile and hypalon are preferred materials for forming the shell of the roller. The shell is then turned to a profile different from that given the body. A cylindrical profile is preferred for the shell, but concave and convex profiles for the outside shell of the roller are within the scope of the invention.

A roller formed by the above described process is substantially unitary, and it typically has a body of a durometer less than the durometer of the shell, wherein the body is given a crown and the shell is given the shape of a uniform cylinder.

A roller formed according to this invention will have substantially uniform hysteresis distribution and an operating life at least twice that of prior art rollers used in the same applications.

The above disclosure will enable one skilled in the art to make and use the invention without undue experimentation.

However, it should be understood that the invention admits of variations in geometries and materials so that the disclosure of the possible combinations of materials and geometries that are within the scope of this invention would cause the specifications to become prolix. Therefore, it should be understood that the scope of the invention should not be limited to the embodiments disclosed, but should only be limited by the appended claims and all equivalents thereto that would be made apparent to one skilled in the art.

What is claimed is:

1. A resilient pressure roller comprising;
   a) a deflection resistant core,
   b) a body of a first rubber material secured to the core, said core having a length of at least twenty four inches,
   c) a outer shell of a second rubber material secured to the body and outer shell has a non-uniform longitudinal thickness, and the body and the outer shell has a minimum outer diameter of at least two and one half inches, and
   d) the core and the body and the shell interact when the roller is running in a pressure nip so that values for pressure, contact area, nip bulge, and surface speed are substantially uniform along the length of the nip.

2. A resilient pressure roller comprising:
   a) a central core of deflection resistant construction and said core has a length of at least twenty-four inches,
   b) a body of resilient rubber which has a first durometer and the body is vulcanized to the core by vulcanization and said body has a nonlinear outer profile,
   c) a thin outer shell of resilient rubber which has a second durometer different from the first durometer of the body with which it is associated and the shell is secured to the body and the shell has a longitudinal outer profile that is different from the longitudinal outer profile of the body and the outer shell has minimum outer diameter of at least two and one half inches, and
   d) the core, the body and the shell interact when the roller is running in a pressure nip so that values for pressure, contact area, nip bulge, and surface speed are substantially uniform along the length of the nip, and thereby provides a pressure roller having low hystereis heating and fatigue characteristics.

3. The roller of claim 2 wherein the body is formed of a rubber taken from the group consisting of; neoprene, nitrile, natural rubber, nitrile/PVC, hydrogenated nitrile, silicone, carboxylated nitrile, and flouroelaster having durometers in the range of from 30 to 80 Shore-A.

4. The roller of claim 2 wherein the shell is formed of a rubber taken from the group consisting of; neoprene, nitrile, natural rubber, nitrile/PVC, hydrogenated nitrile, silicone, carboxylated nitrile, and flouroelaster having durometers in the range of from 48 to 100 Shore-A.

5. The roller of claim 2 wherein the shell has, at its thinest point, a thickness of at least 0.080, and the shell, has at its thickest point, a thickness of at most 0.500.

6. The roller of claim 2 wherein the body has a convex outer profile and the shell has a cylindrical outer profile.

7. The roller of claim 2 wherein the body has a concave outer profile and the shell has a cylindrical outer profile.

8. The roller of claim 2 wherein the body has a convex outer profile and the shell has a concave outer profile.

9. The roller of claim 2 wherein the core is thermal-chemically joined to the body and the body is thermal-chemically joined to the shell to form a substantially unitary structure.

* * * * *